United States Patent
McMurtry et al.

(10) Patent No.: US 7,343,230 B2
(45) Date of Patent: Mar. 11, 2008

(54) METHOD OF OPERATING AN AUTOMATED LAND MAINTENANCE VEHICLE

(75) Inventors: Richard McMurtry, Bristol (GB); Ben McMurtry, Horsley (GB)

(73) Assignee: McMurtry Ltd., Stancombe, Gloucestershire (GB)

(*) Notice: Subject to any disclaimer, the term of this patent is extended or adjusted under 35 U.S.C. 154(b) by 434 days.

(21) Appl. No.: 10/947,827

(22) Filed: Sep. 23, 2004

(65) Prior Publication Data
US 2005/0038578 A1    Feb. 17, 2005

Related U.S. Application Data

(63) Continuation of application No. PCT/GB03/00351, filed on Jan. 28, 2003.

(30) Foreign Application Priority Data
Mar. 26, 2002   (GB)   ............................ 0207110.8

(51) Int. Cl.
*B62D 1/00*       (2006.01)
*A01D 75/28*      (2006.01)
*G06F 19/00*      (2006.01)

(52) U.S. Cl. ............................. 701/23; 701/25; 701/26; 701/50; 172/2; 318/568.12

(58) Field of Classification Search ............... 701/50, 701/23, 25, 26, 28, 24; 318/568.12; 180/167; 172/2; 702/5; 111/200
See application file for complete search history.

(56) References Cited
U.S. PATENT DOCUMENTS

| | | | |
|---|---|---|---|
| 4,769,700 A | 9/1988 | Pryor | |
| 5,032,775 A * | 7/1991 | Mizuno et al. | 701/25 |
| 5,107,946 A | 4/1992 | Kamimura et al. | |
| 5,204,814 A * | 4/1993 | Noonan et al. | 701/25 |
| 5,341,540 A | 8/1994 | Soupert et al. | |
| 5,528,888 A | 6/1996 | Miyamoto et al. | |
| 5,606,850 A | 3/1997 | Nakamura | |
| 5,931,882 A * | 8/1999 | Fick et al. | 701/50 |
| 5,957,304 A * | 9/1999 | Dawson | 209/552 |
| 5,974,347 A * | 10/1999 | Nelson | 701/22 |
| 6,070,673 A * | 6/2000 | Wendte | 172/2 |
| 6,128,574 A | 10/2000 | Diekhans | |
| 6,651,005 B2 * | 11/2003 | O'Neall | 702/5 |
| 6,698,368 B2 * | 3/2004 | Cresswell | 111/200 |

FOREIGN PATENT DOCUMENTS

WO    98/46065    10/1998

* cited by examiner

*Primary Examiner*—Tan Q. Nguyen
(74) *Attorney, Agent, or Firm*—MacMillan, Sobanski & Todd, LLC

(57) ABSTRACT

A method of operating an automated land maintenance vehicle over a work area includes (a) determining a work regime by dividing the work area into regions; selecting at least one instruction for the vehicle to follow with respect to each region; providing data relating to the regions and to the associated instructions to a processor; computing, by the processor, the work regime for the vehicle from the data; and (b) providing data relating to the work regime to a controller of the vehicle, whereby the vehicle is operated to follow the work regime.

20 Claims, 8 Drawing Sheets

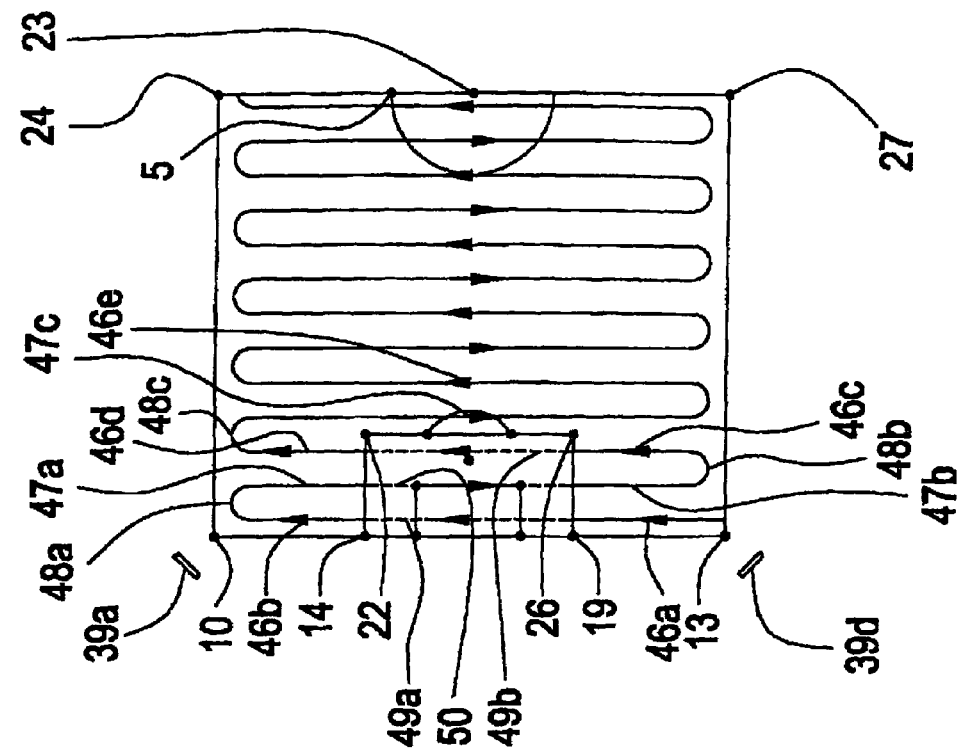
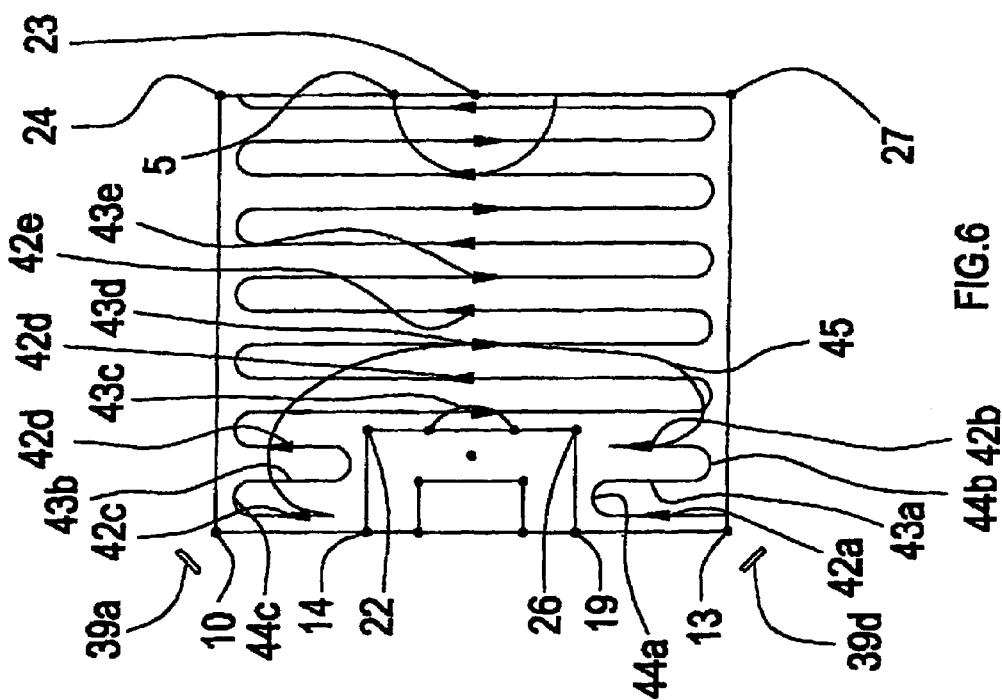

METHOD OF OPERATING AN AUTOMATED LAND MAINTENANCE VEHICLE

CROSS-REFERENCE TO RELATED APPLICATIONS

This application is a continuation of International Application No. PCT/GB03/00351, filed Jan. 28, 2003, which claims priority from U.K. Patent Application No. 0207110.8, filed Mar. 26, 2002. The disclosures of both applications are incorporated herein by reference.

BACKGROUND OF THE INVENTION

This invention relates to a method of operating an automated land maintenance vehicle, particularly, although not exclusively, a vehicle in the form of a mower.

The aesthetic appearance of turfed sports areas such as football pitches or golf courses is very important especially if the area is shown on television. Recently there has been a growing trend for ground maintenance staff to produce increasingly precise and intricate mowing patterns on the turfed surface.

Another and probably more important aspect of the job of ground maintenance staff is maintaining a good playing surface. Various factors may affect the quality of the playing surface, such as the sport being played (different sports damage different areas of the pitch), the local climate, the soil makeup and the frequency of use. There has been always been a requirement for ground maintenance staff to provide a high standard of playing surface for one of two reasons; maintaining a good playing surface against high usage of the football/rugby/American football/baseball and golf areas and to compete for premier sporting events such as high profile golf tournaments.

Conventionally, intricate mowing patterns are put onto the surface by manually pushing or driving the mower around on the surface in order to both cut the grass and to mark the desired mowing pattern. The pattern is achieved by rolling the grass in a particular direction after it has been cut, so that when the area is viewed, the shades produced by mowing in different directions define the pattern. Mowing and/or rolling a standard pattern may take several hours, while more intricate ones will take even longer. This makes for a long and boring job for the ground maintenance staff.

When maintaining a playing surface, the ground maintenance staff generally aim to maintain the grass coverage over the whole surface. Certain factors are considered before ground maintenance staff carry out any mowing or rolling. The factors include: considering areas of high wear (football pitches are prone to high wear in the goal mouth and center spot areas), areas of water logging or dryness and areas of high maintenance wear (excessive turning of maintenance vehicles or trenching due to machines following the same path time after time). The maintenance staff will then decide which areas to mow or roll based on an assessment of the whole surface. Parts of the pitch that are subject to any of the factors indicated above may have to be avoided during a maintenance task. This will increase the time required for the task, as more turning will be needed to carry out an increased number of strokes necessary to avoid the areas that are left to rest and recover.

Robotic mowers operate within a predefined area, mowing the area in a random or predefined route. Domestic robotic mowers exist that mow in parallel lines and these cover the whole mown area with the same pattern. They cannot avoid specific areas of grass unless a physical object such as a bumping board or an energized wire bound the areas.

When these mowers produce patterns, they are always in straight lines. Conventionally, the operator of the mower does not have the option of selecting a circular pattern or areas where grass may be deposited. Indeed due to the limitations of their guidance systems and the size of the area they are designed to cut, it is not uncommon for these domestic machines to miss parts of the area, leaving uncut grass.

Further robotic systems exist whereby the robotic mower has a sensor and computational means for determining its position within an area. Such positional data can be used to navigate the robot in predetermined routes in order to cover the area to be mown. Positional data may be captured by a variety of means, the most common being triangulation or trilateration from fixed known reference positions. Such reference points can be geostationary satellites (GPS) or ground based references that may be sensed by the robot vehicle. Optical and radio based systems are the most common means of determining mobile robot positional data. This positional data may have increased accuracy when averaged with inertial navigation devices that may include odometers, compasses and accelerometers.

SUMMARY OF THE INVENTION

According to one aspect of the present invention, there is provided a method of operating an automated land maintenance vehicle over a work area, the method comprising (a) determining a work regime by dividing the work area into regions; selecting at least one instruction for the vehicle to follow with respect to each region; providing data relating to the regions and to the associated instructions to processing means; and computing, by the processing means, the work regime for the vehicle from the data; and (b) providing data relating to the work regime to control means of the vehicle whereby the vehicle is operated to follow the work regime.

According to another aspect of the present invention, there is provided ground maintenance equipment comprising an automated land maintenance vehicle for operation over a work area, and control means on the vehicle for controlling the operation of the vehicle, the equipment further comprising means for inputting a first set of data relating to work regions; means for inputting a second set of data relating to instructions to be followed with respect to each region; processing means for computing a work regime for the vehicle from the first and second sets of data; means for providing the data relating to the work regime to the vehicle control means, whereby the vehicle is operated to follow the work regime.

The vehicle may be used to perform a variety of ground maintenance tasks such as mowing, rolling, slitting, hollow coring or aeration.

Various objects and advantages of this invention will become apparent to those skilled in the art from the following detailed description of the preferred embodiment, when read in light of the accompanying drawings.

BRIEF DESCRIPTION OF THE DRAWINGS

FIG. 6 is a graphical representation of half a soccer field showing a mowing pattern that excludes a predetermined region;

FIG. 7 is a graphical representation of half a soccer field showing a mowing pattern in which a predetermined region is masked;

DETAILED DESCRIPTION OF THE PREFERRED EMBODIMENTS

For the purposes of promoting an understanding of the principles of the invention, the figures use a soccer field as an example. Methods and equipment in accordance with the present invention may be used on any ground surface, whether or not it is used for sports or recreational purposes.

Figure 1:
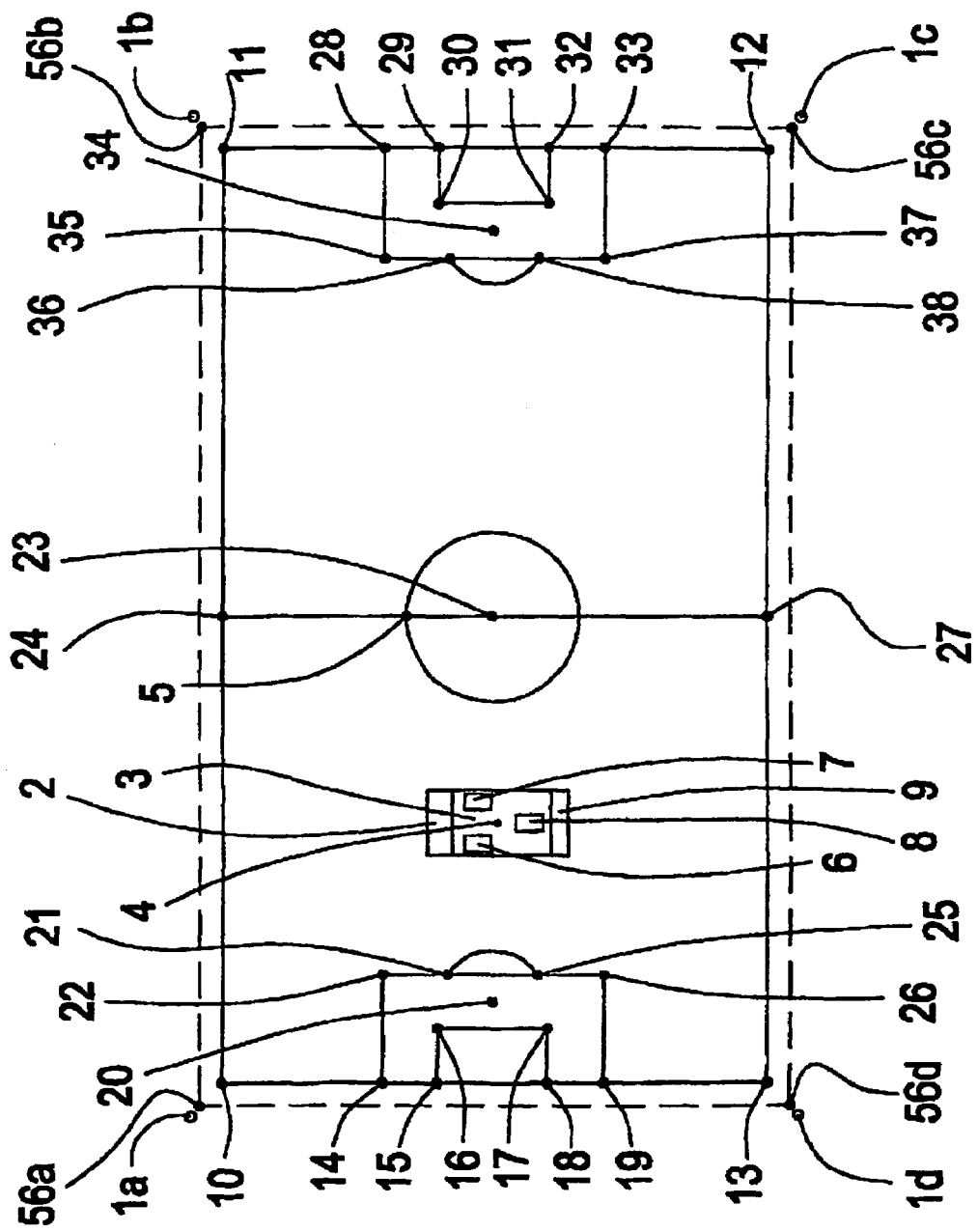
FIG. 1 is a graphical representation of a soccer field with a navigation system.

FIG. 1 shows a plan view of an autonomous mower in the form of a vehicle 57 having 3 ground engaging wheels 6,7,8 supporting a chassis/cowling 3 with a front bumper 2 and rear bumper 9.

The vehicle also carries a computer (not shown), which controls the travel and operation of the vehicle. Four radio emitters 1a, 1b, 1c and 1d are in fixed known surveyed positions. As shown, the emitters 1a, 1b, 1c and 1d are situated just beyond four corners 56a, 56b, 56c and 56d of the boundary of the work area to be mown. The vehicle 57 cannot carry out work outside the boundary defined by known points 56a, 56b, 56c and 56d. The vehicle 57 receives radio transmissions from the emitters 1a, 1b, 1c and 1d via an aerial 4 and can determine its position and therefore can navigate around the work area. Within the boundary defined by the emitters 1a, 1b, 1c and 1d there are several other operator defined regions. The playing area of the soccer pitch is defined by corners 10, 11, 12 and 13. The pitch itself is subdivided into two penalty box regions 14, 22, 26, 19 and 35, 28, 33, 37, two goal areas 15, 16, 17, 28 and 29, 30, 31, 32 and the center spot area defined by the center point 23 and a radius defined by the distance between the center point 23 and a point 5. Other regions, such as pitch halves, are defined, for example, by points 10, 24, 27, 13 and 11, 24, 27, 12. Reference points 15, 18, 29, 32 define the goal post obstacles. Further markings such as the arc on the penalty box are defined by the arc start and finish 21, 25 and 36, 38 and the arc center and penalty spots 22 and 34.

Figure 2:
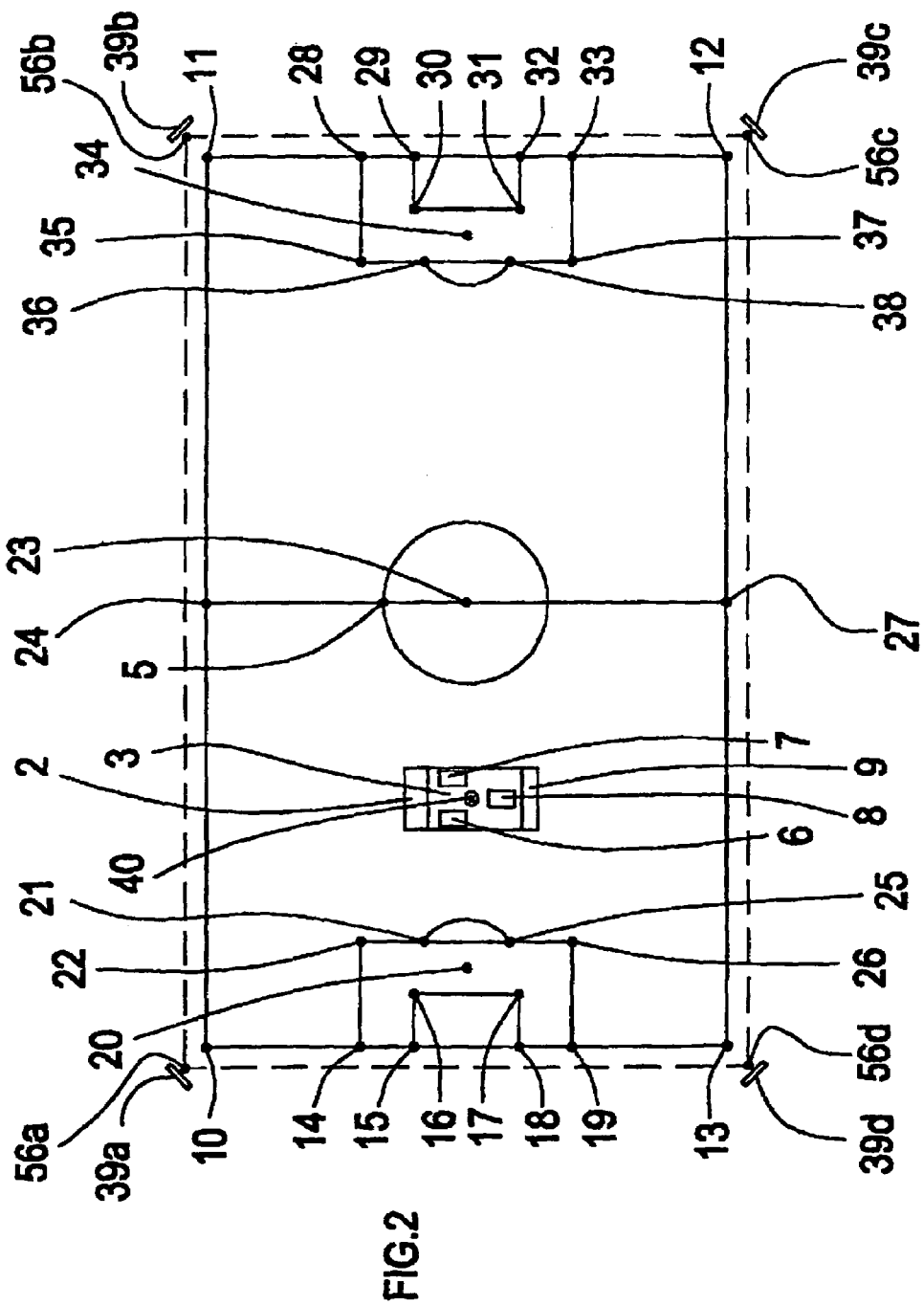
FIG. 2 is a graphical representation of a soccer field with an alternative navigation system.

FIG. 2 shows the same soccer pitch with autonomous vehicle 57 with a laser scanner 40 which uses known fixed reflectors 39a, 39b, 39c and 39d to determine its position within the boundary 56a, 56b, 56c and 56d.

The position of the reference points may be surveyed using conventional surveying equipment and recorded in the vehicle's computer.

The coordinates of the surveyed points may then be used to define the different regions of the work area. In the example of a soccer field the highest-level area may be the boundary 56a, 56b, 56c, 56d, the next the pitch 10, 11, 12, 13, and then sections of the pitch and obstacles, such as the goal posts at points 15, 18, 29, 32. The pitch region may be defined by using the four points that are generally known as the corners, other regions such as the goal mouth may be defined using the corner points of the rectangle that make up the goal area used in soccer pitch markings, and the center spot region may be defined by a specified radius and a center point which may be the center spot of the soccer pitch. During the work regime, the vehicle will work the regions within the boundary through instructions that may be entered into the vehicle's computer via an operator interface.

Further regions within the boundary may be entered into the vehicle's computer if the operator wishes to define regions that are not currently stored in the memory of the vehicle. The operator may define regions using a computer graphical representation of the whole work area whereby the operator may select at least three points that surround a region. A program that can join the points together may be used so that a new region is created within the work area. This region can then be loaded into the memory of the vehicle and used to configure new and different work regimes. The computer graphical representation may be incorporated into the user interface on the vehicle itself or on a separate computer, for example a handheld device, which can then download the new data into the vehicle's computer.

A further method of defining a new region within the memory of the vehicle may include manually driving the vehicle to selected points within the boundary of the work area. The operator may manually drive the vehicle to a point, then, using the user interface, select the point as a coordinate of the new region. Once at least three points of the new region are selected and stored in the vehicle's memory a further program may be used to define the new region by joining the points.

Each region within the boundary may have a task associated with it to occur within the working operation. A task may be defined as one of the following:

Cut: the grass within a region is to be cut;

Roll: the ground within a region is to be rolled;

Treated: the ground within a region is to be treated; e.g. fertilized, spiked, aerated, decompacted, treated with pesticides.

Avoid: the region is to be avoided so that the vehicle is not permitted to enter the region;

Mask: the region has no work to be performed in it, but the vehicle is allowed to use the region for maneuvering in order to perform work in other regions.

The travel of the vehicle to perform work in each region may be divided into working strokes and maneuvers, maneuvers being the route traveled between working strokes. A working stroke may be defined by its start position and heading and its end position and heading and the width of the maintenance unit, such as a mower or roller, with which the vehicle may be operating. A working stroke may be a straight line of travel, a circle or any other curve. The maneuvers between working strokes may be calculated by computational means so that the vehicle can move between the end of one working stroke to the beginning of the next. The nature of the maneuver may be determined by a plurality of parameters that may include the turning radius of the vehicle and the relative location of the regions that are to be maintained differently. If the work performed during a regime is simply required to cover the whole region then the working strokes may be offset by a distance equal to or less than the width of the maintenance unit, with each stroke being parallel and having an opposite heading to an adjacent stroke. If, however, the work to be performed during the regime is to provide a better visual pattern, the visual appearance of the pattern on the grass may be made up of stripes that are wider than the working width of the vehicle maintenance unit. For example, if the working width of the maintenance unit is one meter and the desired width of the stripes cut or rolled into the grass is four meters the vehicle will have to travel four working strokes in the same direction each offset by one meter from each other. The work within the regions that have tasks associated with them may be further defined by angle, direction in which the work is to be done, center of radial cut, one way or cross hatched and the number of passes the vehicle makes in the same direction so as to define the width of the pattern to be worked into the region.

Thus a whole work regime may include cutting/rolling straight lines in one section of the pitch, cutting/rolling arcs or circles in the same or different regions of the pitch, cutting/rolling cross hatches in another area of the pitch or missing out certain worn regions completely or just using the region for maneuvers between strokes. The work regime may further comprise other maintenance tasks to be carried out in the whole of, or part of, the work area. Alternatively a work regime may just be a simple single width cut/roll over the whole pitch.

Figure 3:
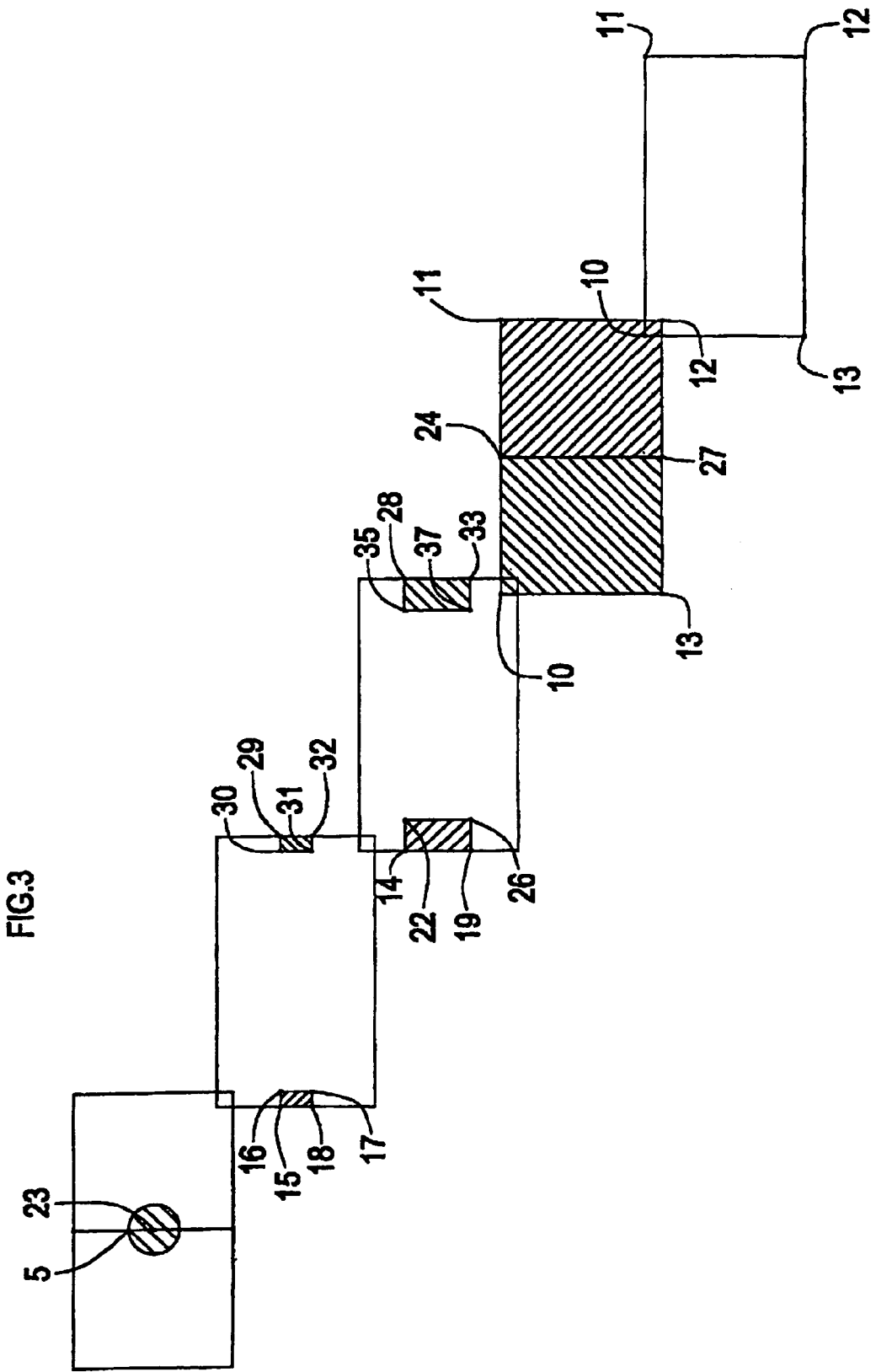
FIG. 3 diagrammatically represents the division of a work area into a plurality of regions.

FIG. 3 shows a soccer field broken down into 5 layers with each layer defining different working regions. The first layer defines the center circle by the center spot 23 and the circle radius equal to the distance between points 23 and 5. The second layer defines the goal areas 15, 16, 17, 18 and 29, 30, 31, 32. The third layer defines the penalty areas 14, 19, 22, 26 and 28, 33, 35, 37. The fourth layer defines the two half areas 10, 24, 27, 13 and 24, 11, 12, 27 and the final layer defines the boundary 10, 11, 13, 12. Each region within each layer may be assigned a different task for the vehicle to carry out during the work regime. In particular, if the vehicle is required to avoid a region while performing a first task, but is allowed to mask the region when performing a second, multiple work regimes can be used to allow this.

Figure 4:
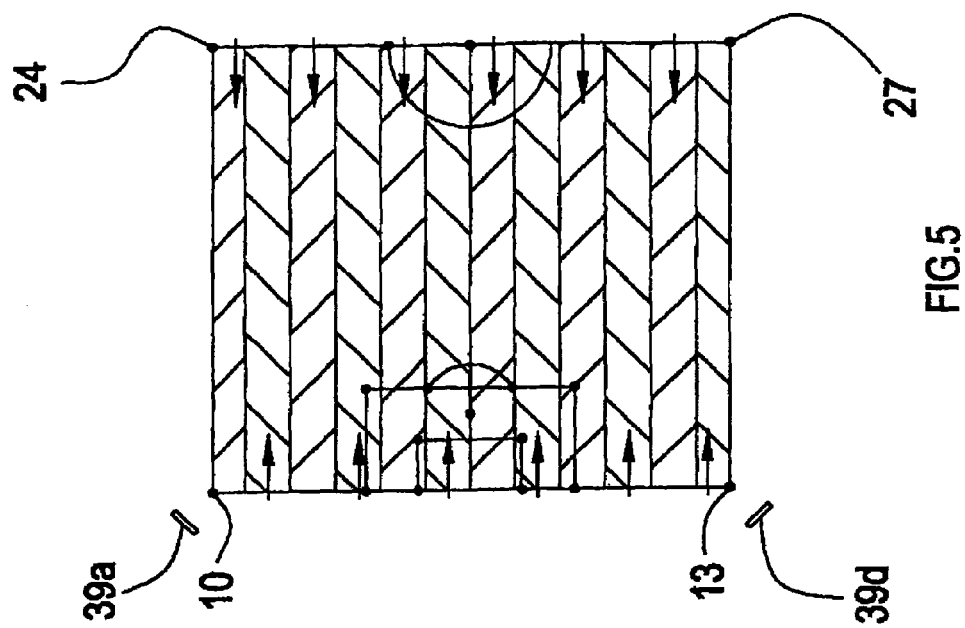
FIG. 4 is a graphical representation of half a soccer field showing a straightforward 90° mow/roll pattern.
Figure 5:
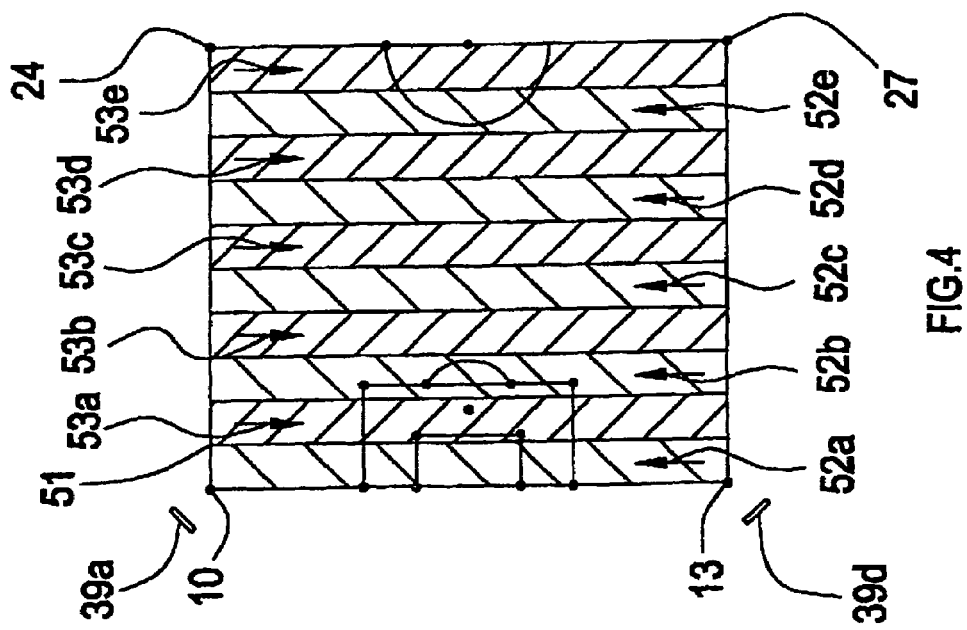
FIG. 5 is a graphical representation of half a soccer field showing a straightforward 0° mow/roll pattern.
Figure 9:
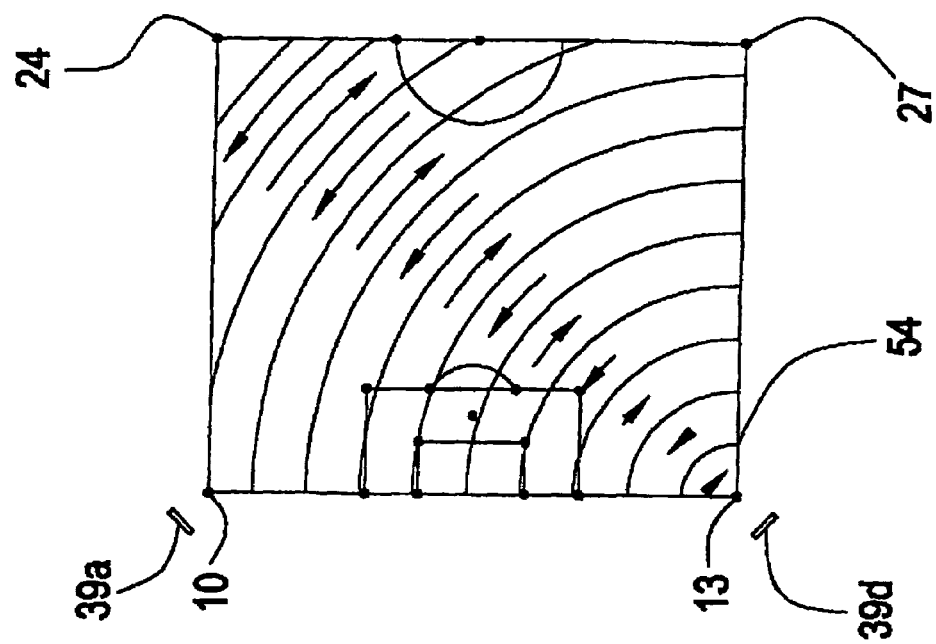
FIGS. 9 and 10 are graphical representations of half a soccer field showing circular mow/roll patterns.
Figure 8:
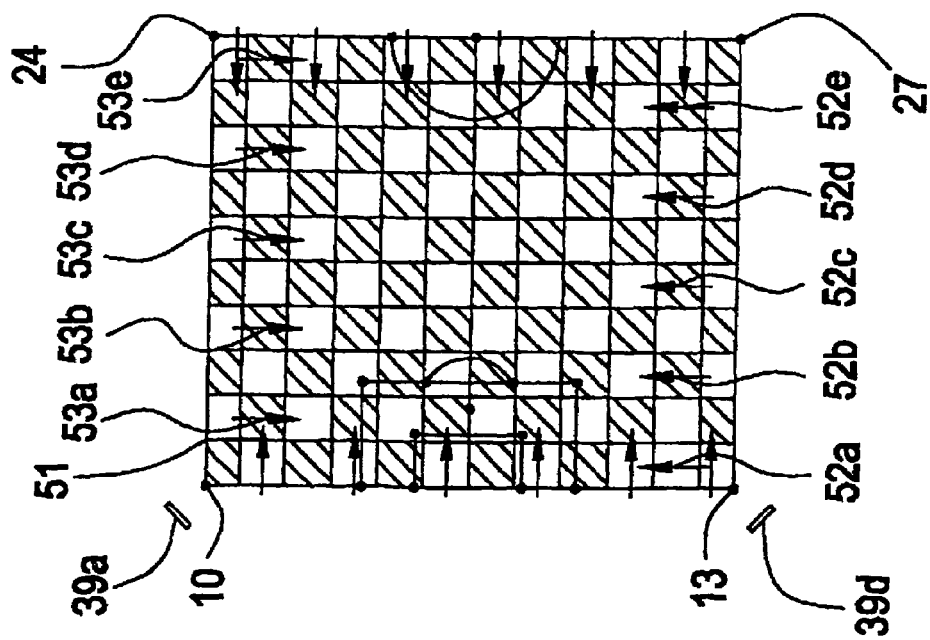
FIG. 8 is a graphical representation of half a soccer field showing a crosshatch mow/roll pattern.
Figure 11:
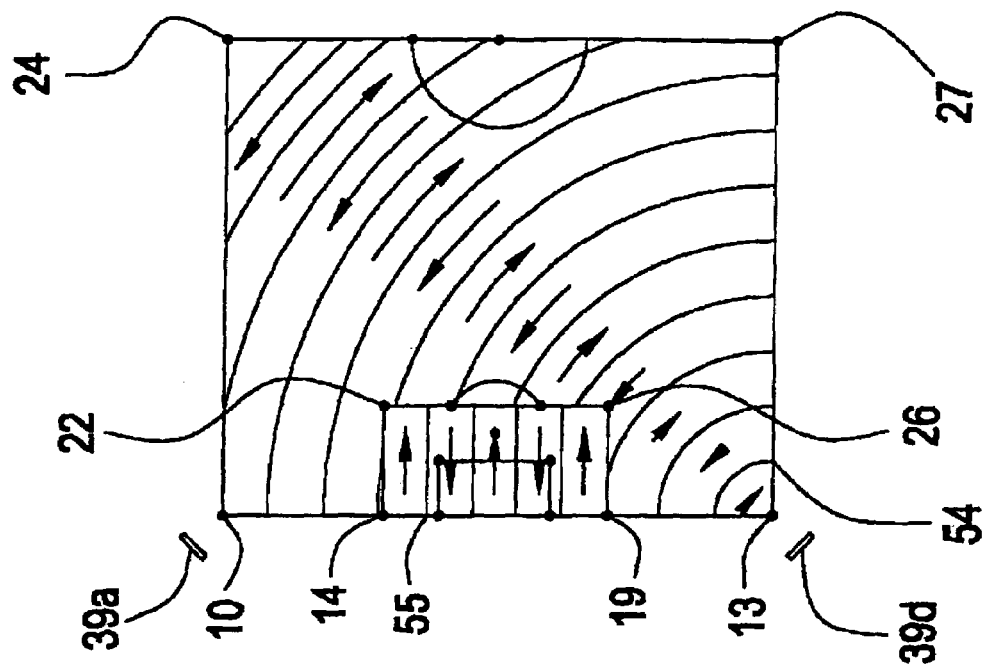
FIG. 11 is a graphical representation of half a soccer field showing different mow/roll patterns being formed in different regions.
Figure 10:
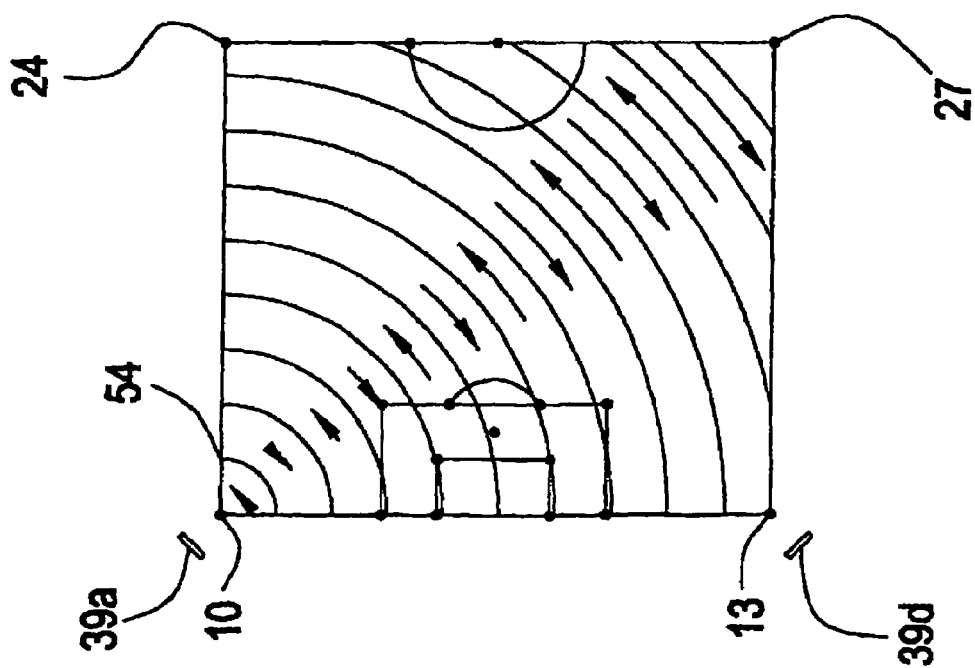

FIGS. 4, 5, 8, 9, 10 and 11 show different cut/roll patterns carried out in the half-pitch area 10, 24, 27, 13. FIG. 4 is a graphical representation of half a soccer field showing a straightforward 90° mow/roll pattern. FIG. 5 is a graphical representation of half a soccer field showing a straightforward 0° mow/roll pattern. FIG. 8 is a graphical representation of half a soccer field showing a cross-hatch mow/roll pattern. FIGS. 9 and 10 are graphical representations of half a soccer field showing circular mow/roll patterns. FIG. 11 is a graphical representation of half a soccer field showing a combination of region mow/roll patterns.

In FIG. 11, the region enclosed by points 10, 24, 27, 13, 19, 26, 22 and 14 is cut using a circular mow/roll pattern, while the region enclosed by points 14, 22, 26 and 19 is cut in a straightforward 0° mow/roll pattern.

FIG. 6 shows a mower path traveled after being instructed to avoid penalty area 14, 22, 26, 19. The mower follows travel path 42*a*, 44*a*, 43*a*, 44*b*, 42*b* whereby the penalty area 14, 22, 26, 19 is avoided, perhaps to minimize wear or to allow for a different pattern to be created within that region. The path taken by the vehicle avoids the region completely by reversing along path 45 and then continuing the mowing by following the travel path 42*c*, 44*c*, 43*b*, 42*d*. The rest of the region is then covered by full width cuts such as 43*c* and 42*d*.

FIG. 7 shows a mower path traveled after being instructed to Mask penalty area 14, 22, 26, 19. The mower travels along route 46*a* with the cutter unit down and raises it to travel across the penalty area along route 49*a* and then lowers it before travelling along route 46*b* thereby not carrying out any maintenance procedure within the penalty area, and only using it to reach the continuation of 46*a*. The mower continues to lift the cutter unit before it enters the penalty area and carries on as normal once the penalty area has been cleared, as shown by routes 47*c*, 46*e*.

Figure 12:
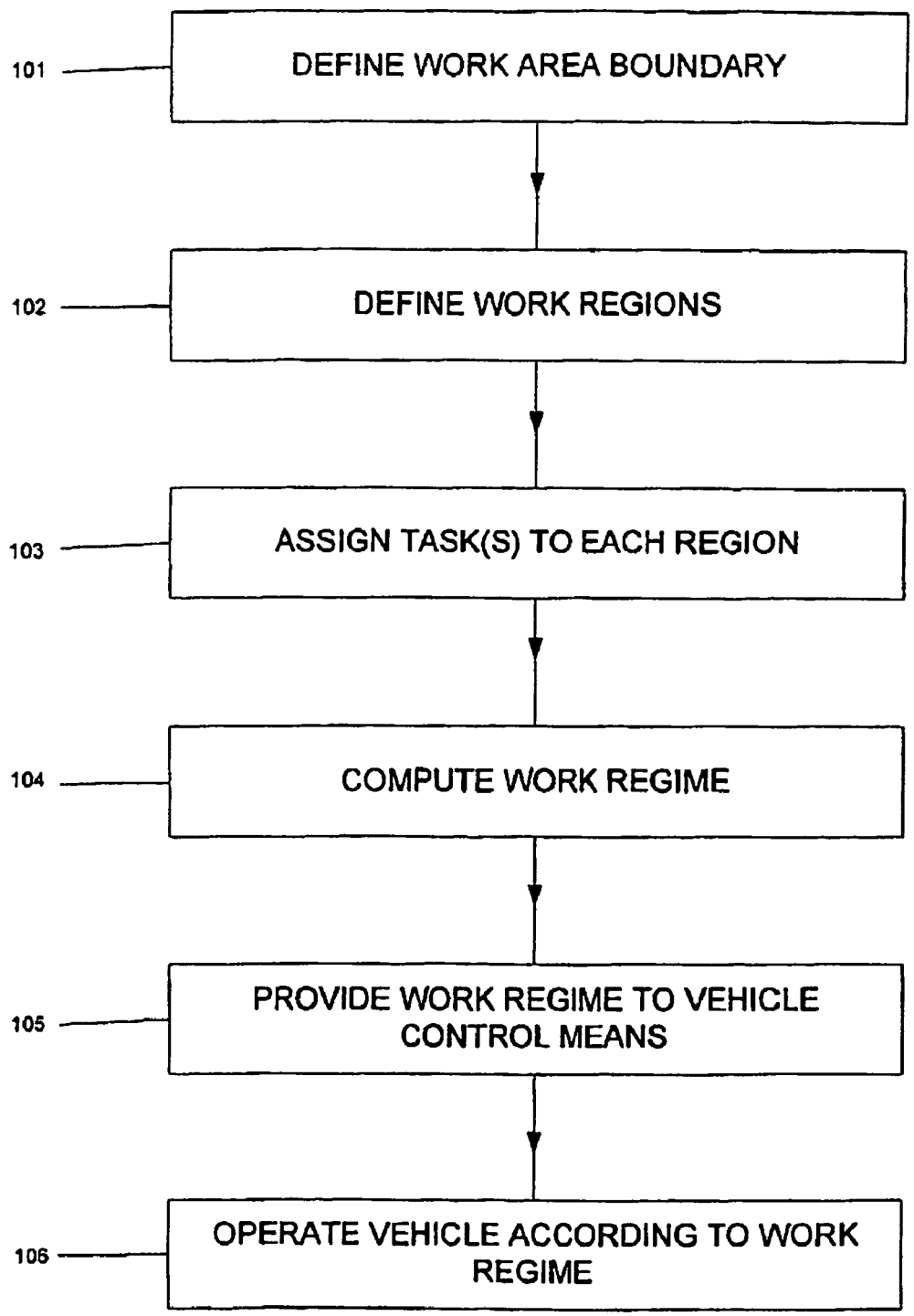
FIG. 12 is a flow chart showing a method of operating an automated land maintenance vehicle over a work area in accordance with the invention.

FIG. 12 is a flow chart showing a method of operating an automated land maintenance vehicle over a work area in accordance with the invention. At step 101, the work area for the vehicle is defined. This may consist of placing radio emitters or laser reflectors at fixed known locations, and instructing the vehicle to operate within that area. Alternatively, the operator may manually drive the vehicle around the work area boundary, instructing the vehicle to remain within the area.

In step 102, the work regions are defined. A number of different regions are created within the work area, within which the vehicle is required to perform a particular operation.

The regions may be selected by any of the following: selecting areas on a graphical representation of the work area, providing coordinates for the region (in the appropriate form with respect to the particular guidance system being used, e.g. laser scanner, radio, GPS, etc), placing additional reference points, such as laser reflectors or radio emitters at the corners of the region or manually driving the vehicle around the boundary of the required region and instructing it to store the route as a boundary.

At step 103, one or more tasks are assigned to the different regions. The task (as described above) may comprise instructing the vehicle to: avoid a region, mask a region, or perform a maintenance task in the region. More than one maintenance task may be assigned to each region. For example, the vehicle may need to cut the grass in the region and also slit the ground. Depending upon the configuration of the maintenance unit on the vehicle, the vehicle may be able to perform both tasks at once or may need to cover the region twice, once cutting the grass, and the other slitting the ground.

The step of assigning tasks to a region may also comprise determining a direction of travel for the vehicle in the region, allowing the vehicle to roll the grass in a desired pattern, and may also comprise selecting a particular path for the vehicle to take in the region.

At step 104, the work regime for the vehicle is computed. The means for computing the work regime may be in the vehicle's computer, or may form part of the separate operator interface. The work regime may comprise a number of strokes and maneuvers for the vehicle to perform, in addition to the type of maintenance operation required. Alternatively, the work regime may comprise a number of points the vehicle must reach, allowing the vehicle to decide the actual route during the work regime.

The work regime is computed taking into account all of the different tasks assigned to each of the regions. If a region is to be avoided, the computing means calculates the route to be traveled by the vehicle so that the vehicle does not enter the particular region. If a region is to be masked, i.e. there is no maintenance operation to be performed in the region, then the computing means calculate the vehicle's route allowing the vehicle to use the region for maneuvers if necessary. If a particular direction of travel in a region, or particular path is required, the computing means calculates the route accordingly.

In step 105, the work regime is provided to the control means of the vehicle. If the computing means is separate from the vehicle, this may comprise transmitting the instructions over the air interface, or by connecting directly to the vehicle's computer and downloading the information.

In step 106, the control means of the vehicle operates the vehicle according to the instructions contained in the work regime.

There is thus provided an automated land maintenance vehicle that has a dynamic control system so that an operator or programmer may vary patterns or maintenance regimes and maneuver travel on the pitch without having to operates the vehicle accurately and intricately themselves.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of operating an automated land maintenance vehicle over a work area defined by a closed boundary so as to create a desired visually discernible pattern on the surface of the work area, the method comprising:
   (a) determining a work regime by:
      dividing the work area into a plurality of regions in accordance with the visually discernible pattern desired on the surface;
      selecting an instruction for the vehicle to follow with respect to each region, the selection of the instruction being determined on the basis of that part of the visually discernible pattern contributed by said region;
      providing data relating to the regions and to the associated instructions to processing means; and
      computing, by the processing means, the work regime for the vehicle from the data; and
   (b) providing data relating to the work regime to the control means of the vehicle whereby the vehicle is operated to follow the work regime, thereby creating the desired visually discernible pattern on the surface of the work area.

2. A method as claimed in claim 1, wherein the work regime is defined as a number of strokes and manoeuvres and a type of maintenance operation required.

3. A method as claimed in claim 1, wherein an instruction comprises instructing the vehicle to perform a maintenance procedure in the region.

4. A method as claimed in claim 3, wherein said maintenance procedure comprises mowing grass.

5. A method as claimed in claim 3, wherein said maintenance procedure comprises rolling grass in a determined direction.

6. A method as claimed in claim 3, wherein said maintenance procedure comprises hollow coring.

7. A method as claimed in claim 3, wherein said maintenance procedure comprises slitting.

8. A method as claimed in claim 3, wherein said maintenance procedure comprises top dressing.

9. A method as claimed in claim 3, wherein the step of selecting an instruction further comprises selecting a direction of travel for the vehicle in the region.

10. A method as claimed in claim 3, wherein the step of selecting an instruction further comprises selecting a path for the vehicle to travel over in the region.

11. A method as claimed in claim 10, wherein the path is curved.

12. A method as claimed in claim 1, wherein an instruction comprises allowing the vehicle to travel through a region without performing a maintenance operation.

13. A method as claimed in claim 1, wherein an instruction comprises instructing the vehicle to avoid a region.

14. A method as claimed in claim 1, wherein a plurality of work regimes are followed in turn in a single operation on the work area.

15. Ground maintenance equipment comprising:
   an automated land maintenance vehicle for operation over a work area defined by a closed boundary;
   control means on the vehicle for controlling the operation of the vehicle so as to create a desired visually discernible pattern on the surface of the work area;
   means for inputting a first set of data relating to a plurality of work regions in accordance with the visually discernible pattern desired on the surface;
   means for inputting a second set of data relating to instructions to be followed with respect to each region, the selection of the instructions being determined on the basis of that part of the visually discernible pattern contributed by said region;
   processing means for computing a work regime for said vehicle from said first and second sets of data;
   means for providing the data relating to the work regime to the vehicle control means, wherein the vehicle is operated to follow the work regime, thereby creating the desired visually discernible pattern on the surface of the work area.

16. Ground maintenance equipment as claimed in claim 15, wherein the means for inputting said first and second sets of data comprise a handheld interface.

17. Ground maintenance equipment as claimed in claim 16, wherein the handheld interface further comprises said processing means for computing a work regime.

18. Ground maintenance equipment as claimed in claim 15, wherein the first and second sets of data are input using a graphical display.

19. Ground maintenance equipment as claimed in claim 15, wherein the processing means is implemented in software.

20. Ground maintenance equipment as claimed in claim 15, wherein the processing means is implemented in hardware.

* * * * *